Oct. 19, 1943.                J. B. CLARK                2,331,961
                          OIL FILTER CARTRIDGE
                          Filed Nov. 5, 1941

INVENTOR.
by Joel B. Clark
Parker, Rockwood & Farmer.
ATTORNEYS.

Patented Oct. 19, 1943

2,331,961

UNITED STATES PATENT OFFICE 2,331,961

OIL FILTER CARTRIDGE

Joel B. Clark, Kenmore, N. Y.

Application November 5, 1941, Serial No. 417,920

7 Claims. (Cl. 210—140)

This invention relates to improvements in filters, such for example, as may be used in filtering the lubricating oil of an internal combustion engine, and more particularly to improvements in the construction of the replaceable filter cartridges containing the filtering material.

One of the objects of this invention is to provide a removable filter cartridge of improved construction for use in filters of this kind, whereby the capacity and efficiency of the cartridge is increased. It is also an object of this invention to provide a cartridge of this type of comparatively simple and inexpensive construction.

Other objects and advantages of this invention will be apparent from the following description and claims.

Figure 1:
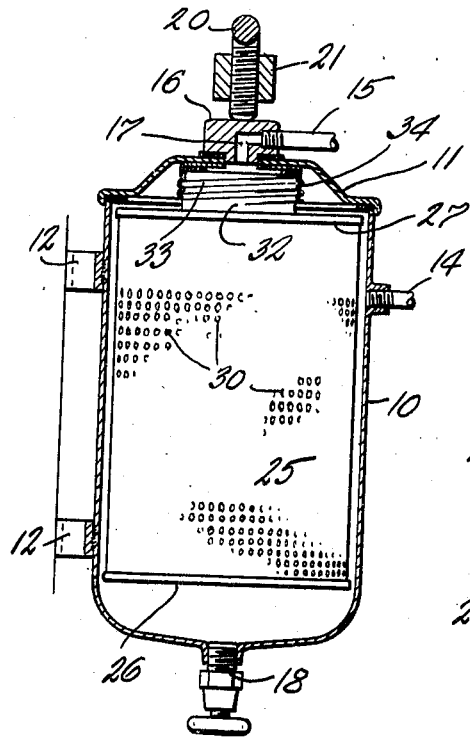
Fig. 1 is a central, sectional elevation of an oil filtering device having a filter cartridge embodying this invention applied thereto, the cartridge being shown in elevation.
Figure 2:
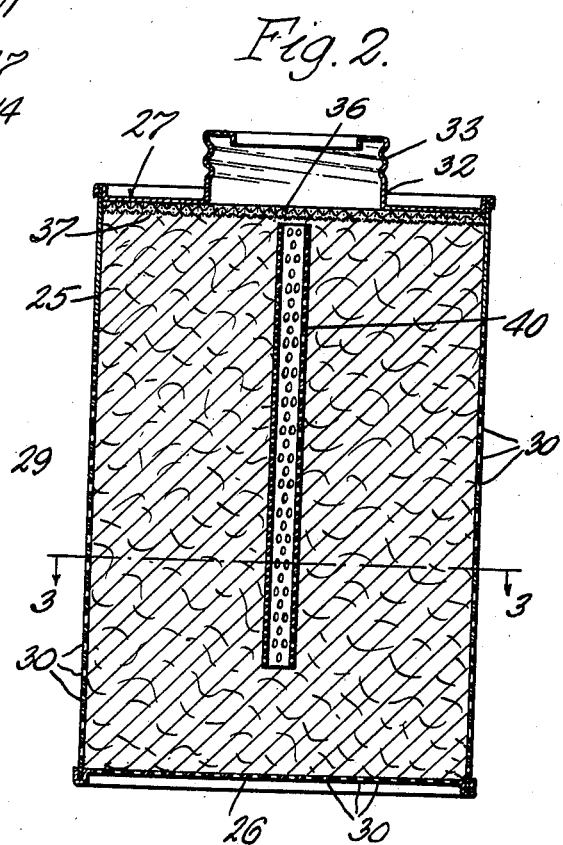
Fig. 2 is a central sectional elevation of the cartridge.
Figure 3:
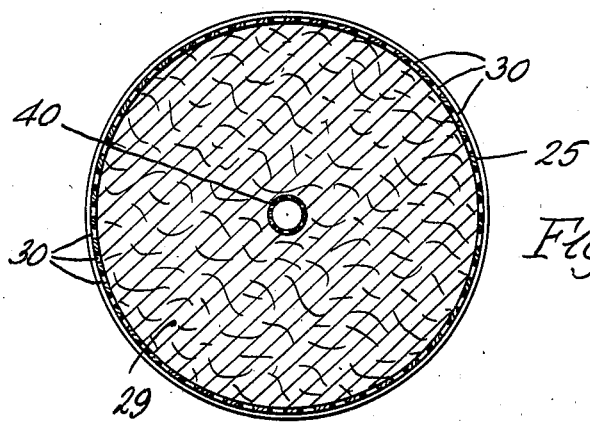
Fig. 3 is a sectional plan view thereof, on line 3—3, Fig. 2.

My improved filter cartridge may be used in connection with an oil filtering apparatus of any usual or suitable type, and in Fig. 1, the cartridge is shown in an oil filtering device, which may be mounted on the exterior of an engine, but it is to be understood that the particular apparatus shown in this figure is merely illustrative of one type of apparatus in which my improved cartridge may be employed. The filtering apparatus shown in Fig. 1 includes a casing 10 of any suitable or desired material, that shown being of tubular form and having a removable cover 11 which may be suitably clamped or otherwise secured to the casing 10 to form an oil-tight connection therewith. The casing 10 may be secured by means of brackets 12 to a side of the engine, and the oil to be filtered may enter the casing under pressure from the engine through an inlet duct 14, and filtered oil may be discharged from the casing through a tube 15 secured to a connecting member 16 having a passage 17 extending to the interior of the casing, the connecting member being secured to the cover 11. The casing may, if desired, be provided with a drain plug 18 in the lower end thereof. The cover 11 may be held in place on the casing 10 in any suitable or desired manner, for example, by means of a clamping screw 20 extending through a member 21, the ends of which (not shown) may be secured to the casing 10.

My improved cartridge includes a container or can which may be of any suitable or desired form to fit into the casing 10, that shown having a cylindrical body portion or side wall 25, a bottom 26 which may be seamed or otherwise secured to the lower edge of the side wall of the container, and a head or upper wall 27 which may be suitably secured to the upper end of the cylindrical body of the container. While I have for the sake of convenience described the walls 26 and 27 as located at the bottom and top of the cartridge, it will be obvious that the filter cartridge may be arranged in any desired position, and will operate successfully when inverted or arranged on its side.

Within the container is the usual mass of filter material 29 which is preferably packed fairly tightly within the container. This filter mass may be of any suitable or desired material, a fibrous material, such as cotton waste, preferably being employed. If desired, this filter mass may be impregnated with a material for treating the oil or to aid in the filtering of the same.

In the particular construction shown, the oil in order to pass through the filter mass enters the container through a relatively large number of perforations or openings 30 formed both in the side wall 25 and bottom 26 of the container, and the top 27 of the container is provided with a suitable outlet for the filtered oil. This outlet may be of any suitable or desired form, depending upon the type of housing or casing with which this filter unit or cartridge is to be employed. In the particular construction illustrated, the top 27 of the container is provided with a neck 32 having a threaded portion 33 which is formed to cooperate with a flange or sleeve 34 which is secured to the inner face of the top or cover 11 of the filtering device shown in Fig. 1. The neck communicates with the interior of the casing so that the oil which is passed through the filter mass collects in the neck for discharge through pipe 15 shown in Fig. 1.

The filter cartridge or unit is preferably provided in the upper portion thereof, next to the cover or head 27 with means of any suitable or desired form for facilitating the collection of the filtered oil, which has passed through the filter mass, in the neck 32. Such means may, for example, be in the form of a disk shaped piece of wire mesh or screening 36 which is preferably made of fairly coarse wire so that the oil passing upwardly to the peripheral portions of the top of the can or container may readily flow radially about the wires of the screening material toward the neck 32. In order to prevent the particles of filtering material from clogging the coarse screen 36, a layer of cloth or other woven material 37 may be provided between the screening material 36 and the filter mass 29.

In order to increase the efficiency of the filter cartridge, a central perforated tube is provided for the purpose of conducting oil from different parts of the interior of the filter mass to the neck 32 of the cartridge. I have found that very effective results can be obtained if a perforated tube, such as the tube 40, is embedded in the filter mass in such a manner that the bottom of the tube terminates at a distance from the bottom of the container, and if the top of the tube is adjacent to the screen 36. My improved tube need not be mounted on or rigidly connected to any part of the filter cartridge, since it will be retained approximately in the axial position described by means of the filter mass. Oil entering the lower open end of the tube or any of the perforations in the tube will flow upwardly in the tube through the open upper end thereof, and since this open upper end is in close proximity to the wire screen 36, the oil will readily flow through the fabric 37 and this screen into the neck 32 for discharge from the cartridge.

Since oil flows readily along the screening material 36, it is, of course, necessary to avoid having any of the oil pass to this screening material before it has taken a path of the desired length through the filter mass. Consequently, the upper portion of the side or shell of the container is left unperforated, so that oil entering the upper perforations must pass through a substantial quantity of filtering material before passing to the screen 36. Since it is desirable that all oil passing through the filter cartridge takes paths through the filter mass of substantially equal lengths, the imperforate upper zone of the shell of the container is preferably of a width approximately equal to the radius of the container, or slightly less. For the same reason, the lower end of the tube 40 is spaced a similar distance from the bottom of the container.

In the operation of the filter cartridge in a filter, the oil to be filtered enters the casing 10 through the inlet pipe 14 and surrounds all of the cartridge except the neck thereof, which has an oil-tight connection with the cover 11. The oil is forced by pressure through the holes or perforations in the sides and bottom of the can or container of the cartridge and passes through the filter mass to the central tube 40. The oil is discharged from the upper end of the tube through the screen 36 into the neck of the cartridge and then flows through the discharge pipe 15 back to the engine.

While the oil preferably passes through the filter cartridge from the outside thereof to the perforated tube and the neck, so that heavy particles of foreign matter may drop from the inlet to the bottom of the casing 10 without plugging or interfering with the passage of oil through the cartridge, yet if desired, the flow of oil may be reversed so that the oil enters the neck and then flows through the screening material and perforated tube through the filter mass.

I claim as my invention:

1. A removable cartridge for use in an oil filter of an internal combustion engine, said cartridge including a container having the greater part of the side perforated and having one end thereof perforated and having the other end thereof provided with an outlet for filtered oil, a body of filtering material substantially filling said container, and a perforate tube arranged substantially coaxially in said container and held in place by said filtering material, one end of said tube being arranged in immediate proximity to but spaced from said outlet and the other end of said tube terminating at a distance from said perforated end of said container.

2. A removable cartridge for use in an oil filter of an internal combustion engine, said cartridge including a container having the greater part of the side perforated and having one end thereof perforated and having the other end thereof provided with an outlet for filtered oil, a body of filtering material packed in said container, and a perforate tube in said container which is spaced from said sides and said perforated end of said container and which receives oil which has passed through said material, said tube being supported in its operative position solely by said material, said tube having a discharge end arranged in close proximity to said outlet of said container.

3. A removable cartridge for use in an oil filter of an internal combustion engine, said cartridge including a container having perforations in the side and one end thereof and having the other end thereof provided with an outlet for filtered oil, a body of filtering material packed in said container, a layer of screening material interposed between said filtering material and said outlet end of said container and having passages in which filtered oil may flow along said outlet end to the outlet therein, and a perforate tube embedded in said filtering material and spaced from said perforate sides and end of said container, one end of said tube terminating in immediate proximity to said screening material.

4. A removable cartridge for use in an oil filter of an internal combustion engine, said cartridge including a container having perforations in the side and one end thereof and having the other end thereof provided with an outlet for filtered oil, a body of filtering material packed in said container, a layer of screening material interposed between said filtering material and said outlet end of said container and having passages in which filtered oil may flow along said outlet end to the outlet therein, and a perforate tube embedded in said filtering material and spaced substantially equidistant from the perforations in said sides and end, one end of said tube terminating in close proximity to said screening material but being unattached therefrom.

5. A removable cartridge for use in an oil filter of an internal combustion engine, said cartridge including a container having perforations in the side and one end thereof and having the other end thereof provided with a substantially centrally disposed neck, a body of filtering material substantially filling said container, a layer of screening material arranged between said filtering material and said other end of said container and extending across said neck, and a perforated tube embedded in said filtering material and supported solely thereby and arranged substantially coaxially with said container, one end of said tube terminating at said screening material and the other end thereof terminating in spaced relation to the perforated end of said container.

6. A removable cartridge for use in an oil filter of an internal combustion engine, said cartridge including a container having perforations in the side and one end thereof and having the other end thereof provided with an outlet for filtered oil, a body of filtering material substantially filling said container, a layer of substantially rigid woven material interposed between said body and said other end of the container and a perforate tube substantially centrally disposed in said container and terminating at one end at said woven material and at its other end at a distance from the perforate end of said container, equal to about the radius of the container, an annular end portion of the container side extending from said other end thereof to a distance of about the radius of the container being imperforate.

7. A removable cartridge for use in an oil filter of an internal combustion engine, said cartridge including a container having perforations in the side and one end thereof and having the other end thereof provided with, a substantially centrally disposed neck, a body of filtering material substantially filling said container, and a layer of screening material arranged between said filtering material and said other end of said container and extending across said neck and substantially coextensive with said other end of said container and forming passages between the adjacent end of said container and the filtering material in which oil can flow radially to said neck, the side of the container having an imperforate zone adjacent to said screening material.

JOEL B. CLARK.